United States Patent
Cole et al.

(10) Patent No.: US 9,687,946 B2
(45) Date of Patent: Jun. 27, 2017

(54) AUTOMATED APPARATUS FOR USE IN SELECTIVELY INSTALLING TEMPORARY FASTENERS IN AN ASSEMBLY

(71) Applicant: The Boeing Company, Seal Beach, CA (US)

(72) Inventors: David William Cole, Bellevue, WA (US); Franklin Bernard French, Auburn, WA (US); Daniel Thomas Long, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 200 days.

(21) Appl. No.: 14/256,285

(22) Filed: Apr. 18, 2014

(65) Prior Publication Data

US 2015/0298825 A1 Oct. 22, 2015

(51) Int. Cl.
*B23P 23/00* (2006.01)
*B23P 19/06* (2006.01)
(Continued)

(52) U.S. Cl.
CPC ............ *B23Q 3/183* (2013.01); *B21J 15/142* (2013.01); *B23B 35/00* (2013.01); *B23P 19/04* (2013.01); *B23P 19/06* (2013.01); *B23P 19/12* (2013.01); *B23B 39/00* (2013.01); *B23P 2700/01* (2013.01); *B64F 5/10* (2017.01); *Y10S 901/41* (2013.01); *Y10T 29/49815* (2015.01); *Y10T 29/49947* (2015.01); *Y10T 29/49954* (2015.01); *Y10T 29/5107* (2015.01); *Y10T 29/5143* (2015.01); *Y10T 29/5176* (2015.01);
(Continued)

(58) Field of Classification Search
CPC .................................................. Y10T 29/5107
USPC ......................................................... 29/26 A
See application file for complete search history.

(56) References Cited

U.S. PATENT DOCUMENTS

| 2,375,112 A | * | 5/1945 | Kanihan | ............... | B23B 47/284 |
| | | | | | 408/112 |
| 4,995,148 A | * | 2/1991 | Bonomi | ................... | B21J 15/10 |
| | | | | | 29/26 A |

(Continued)

FOREIGN PATENT DOCUMENTS

EP 0917920 A2 5/1999

*Primary Examiner* — Erica E Cadugan
(74) *Attorney, Agent, or Firm* — Armstrong Teasdale LLP

(57) ABSTRACT

An automated apparatus for use in selectively installing temporary fasteners in an assembly is provided. The apparatus includes an end effector, a cutting mechanism coupled to the end effector and that forms an opening in the assembly when a potential opening location is substantially aligned with a cutting mechanism center point. The apparatus also includes at least one of a first sub-assembly and a second sub-assembly coupled to the end effector. The first sub-assembly includes a temporary fastener insertion mechanism that inserts a temporary fastener through the opening in the assembly when the opening is substantially aligned with an insertion mechanism center point different from the cutting mechanism center point. The second sub-assembly includes a temporary fastener removal mechanism that removes installed temporary fasteners from the assembly when the installed temporary fastener is substantially aligned with a removal mechanism center point different from the cutting mechanism center point.

17 Claims, 8 Drawing Sheets

(51) Int. Cl.
*B23B 39/00* (2006.01)
*B23Q 3/18* (2006.01)
*B23B 35/00* (2006.01)
*B23P 19/12* (2006.01)
*B23P 19/04* (2006.01)
*B21J 15/14* (2006.01)
*B64F 5/00* (2017.01)
*B64F 5/10* (2017.01)

(52) U.S. Cl.
CPC ............ *Y10T 29/5191* (2015.01); *Y10T 29/53* (2015.01); *Y10T 408/93* (2015.01)

(56) References Cited

U.S. PATENT DOCUMENTS

| | | | | |
|---|---|---|---|---|
| 5,263,236 A | * | 11/1993 | Givler | B23B 39/16 29/243.53 |
| 5,694,690 A | | 12/1997 | Micale | |
| 6,011,482 A | * | 1/2000 | Banks | B21J 15/10 29/407.05 |
| 6,108,896 A | * | 8/2000 | Gignac | B21J 15/10 227/152 |

* cited by examiner

US 9,687,946 B2

AUTOMATED APPARATUS FOR USE IN SELECTIVELY INSTALLING TEMPORARY FASTENERS IN AN ASSEMBLY

BACKGROUND

The field of the present disclosure relates generally to manufacturing assemblies using temporary fasteners and, more specifically, to an apparatus and methods of automated insertion and/or removal of cleco fasteners from assemblies.

At least some known aircraft assemblies are manufactured using panelized construction to form a plurality of barrel sections that include substructure components such as longerons, stringers, bulkheads, and frames. The longerons, stringers, bulkheads, and frames reinforce the skin of the aircraft and maintain a cross-sectional shape of a fuselage and/or wing structure. Specifically, fasteners are used to couple the substructure components to the skin of the aircraft, to couple the substructure components together, and/or to couple adjacent barrel sections together. Coupling aircraft components together using fasteners generally requires accurately cutting holes for the fasteners in the adjacent aircraft components.

In at least some known manufacturing processes, temporary fasteners, such as cleco fasteners, are inserted into the fastener holes to facilitate maintaining alignment of the adjacent aircraft components to be coupled together. The temporary fasteners are inserted into the fastener holes after they are drilled, and the temporary fasteners are easily removed when more permanent fasteners are ready to be inserted into the fastener holes. Accurately cutting fastener holes, and selectively installing temporary fasteners therein may be a time consuming and laborious task. As such processes increasingly become automated, it may be desirable to facilitate efficient insertion and/or removal of the temporary fasteners in known assemblies to reduce manufacturing time of the assemblies.

BRIEF DESCRIPTION

In one aspect, an automated apparatus for use in selectively installing temporary fasteners in an assembly is provided. The apparatus includes an end effector, a cutting mechanism coupled to the end effector, wherein the cutting mechanism is configured to form an opening in the assembly when a potential opening location is substantially aligned with a cutting mechanism center point. The apparatus also includes at least one of a first sub-assembly and a second sub-assembly coupled to the end effector. The first sub-assembly includes a temporary fastener insertion mechanism configured to insert at least one of the temporary fasteners through the opening in the assembly when the opening is substantially aligned with an insertion mechanism center point different from the cutting mechanism center point. The second sub-assembly includes a temporary fastener removal mechanism configured to remove installed temporary fasteners from the assembly when at least one of the installed temporary fasteners is substantially aligned with a removal mechanism center point different from the cutting mechanism center point.

In another aspect, an end effector of an automated apparatus for use in selectively installing temporary fasteners in an assembly is provided. The end effector includes a first sub-assembly and a second sub-assembly coupled to the end effector. The first sub-assembly includes a temporary fastener insertion mechanism configured to insert at least one of the temporary fasteners through the opening in the assembly when the opening is substantially aligned with an insertion mechanism center point different from the cutting mechanism center point. The second sub-assembly includes a temporary fastener removal mechanism configured to remove installed temporary fasteners from the assembly when at least one of the installed temporary fasteners is substantially aligned with a removal mechanism center point different from the cutting mechanism center point.

In yet another aspect, a method of selectively installing temporary fasteners in an assembly is provided. The temporary fasteners are selectively installed using an end effector including a cutting mechanism and a temporary fastener insertion mechanism. The method includes substantially aligning a cutting mechanism center point of the cutting mechanism with a potential opening location on the assembly, forming, with the cutting mechanism, an opening in the assembly at the potential opening location, substantially aligning an insertion mechanism center point of the temporary fastener insertion mechanism with the opening formed in the assembly, wherein the insertion mechanism center point is different than the cutting mechanism center point, and inserting, with the temporary fastener insertion mechanism, at least one of the temporary fasteners through the opening in the assembly.

DETAILED DESCRIPTION

The implementations described herein relate to an automated apparatus for use in selectively installing temporary fasteners in an assembly. As used herein, "selectively" is used as a modifier for a subsequent verb (e.g., "selectively installing" refers to installing and/or uninstalling). In the exemplary implementation, the automated apparatus includes mechanisms that form holes in the assembly, and that selectively install the temporary fasteners therein. The mechanisms are coupled to an end effector/robotic arm assembly that individually aligns each mechanism with the assembly when performing respective functions. As such, the automated apparatus selectively installs temporary fasteners in the assembly in a more efficient and less labor-intensive manner to facilitate reducing the manufacturing time and cost of manufacturing known assemblies.

Figure 1:
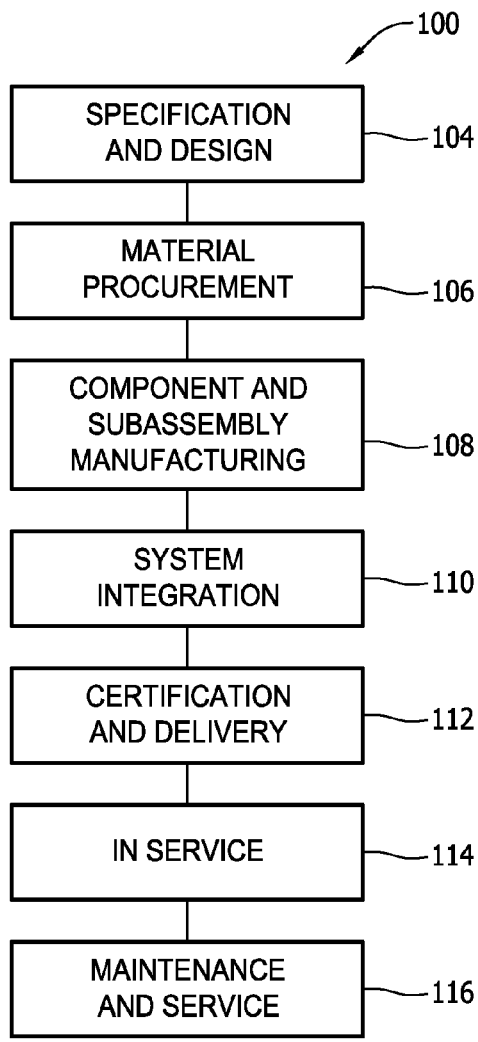
FIG. 1 is a flow diagram of an exemplary aircraft production and service method.
Figure 2:
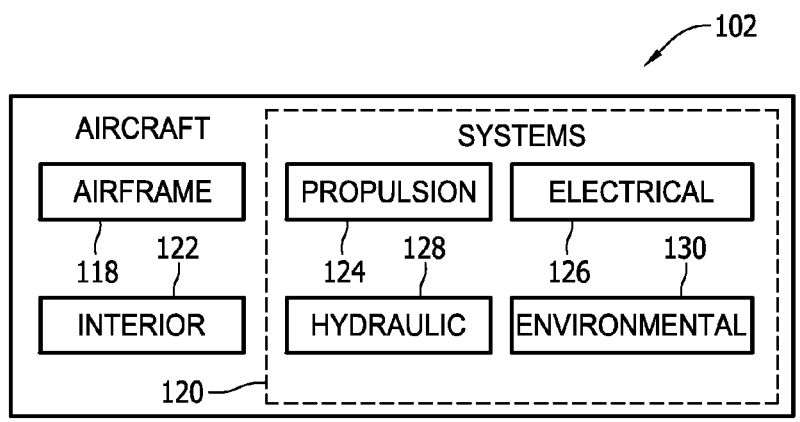
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
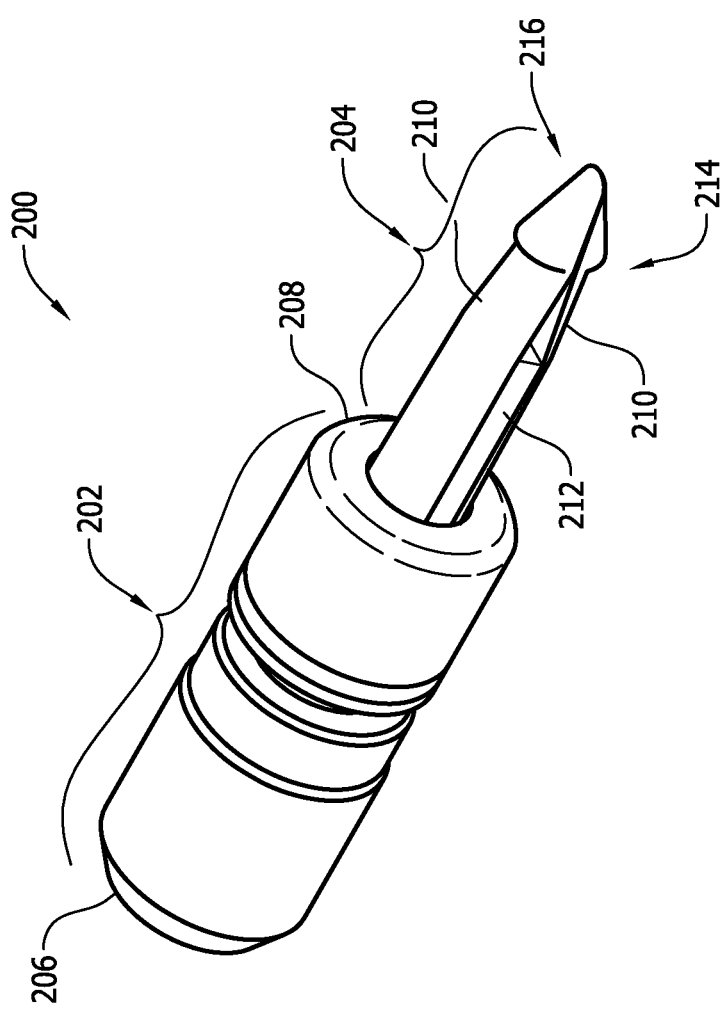
FIG. 3 is a perspective view of an exemplary temporary fastener that may be used in the aircraft production and service method shown in FIG. 1.

FIG. 3 is a perspective view of an exemplary temporary fastener 200 that may be used in aircraft production and service method 100. In the exemplary implementation, temporary fastener 200 includes a barrel portion 202 and a shaft portion 204. Barrel portion 202 includes a first end 206 and a second end 208, and shaft portion 204 is at least partially inserted within barrel portion 202 through second end 208. Shaft portion 204 includes complementary spreading sections 210 and a spreader 212 positioned therebetween. In operation, spreader 212 is selectively retractable within barrel portion 202 to facilitate actuating spreading sections 210 between an open position (not shown) and a closed position 214. For example, spreading sections 210 are in the open position when spreader 212 extends towards a tip portion 216 of shaft portion 204, and are in closed position 214 when spreader 212 retracts within barrel portion 202. Spreader 212 is actuated as a function of rotation of barrel portion 202 relative to shaft portion 204. Alternatively, spreader 212 is actuated as a function of any suitable mechanism. As such, shaft portion 204 is sized for insertion through an opening in an assembly (each not shown in FIG. 3) such that temporary fastener 200 and, more specifically, tip portion 216 selectively engages the assembly.

Figure 4:
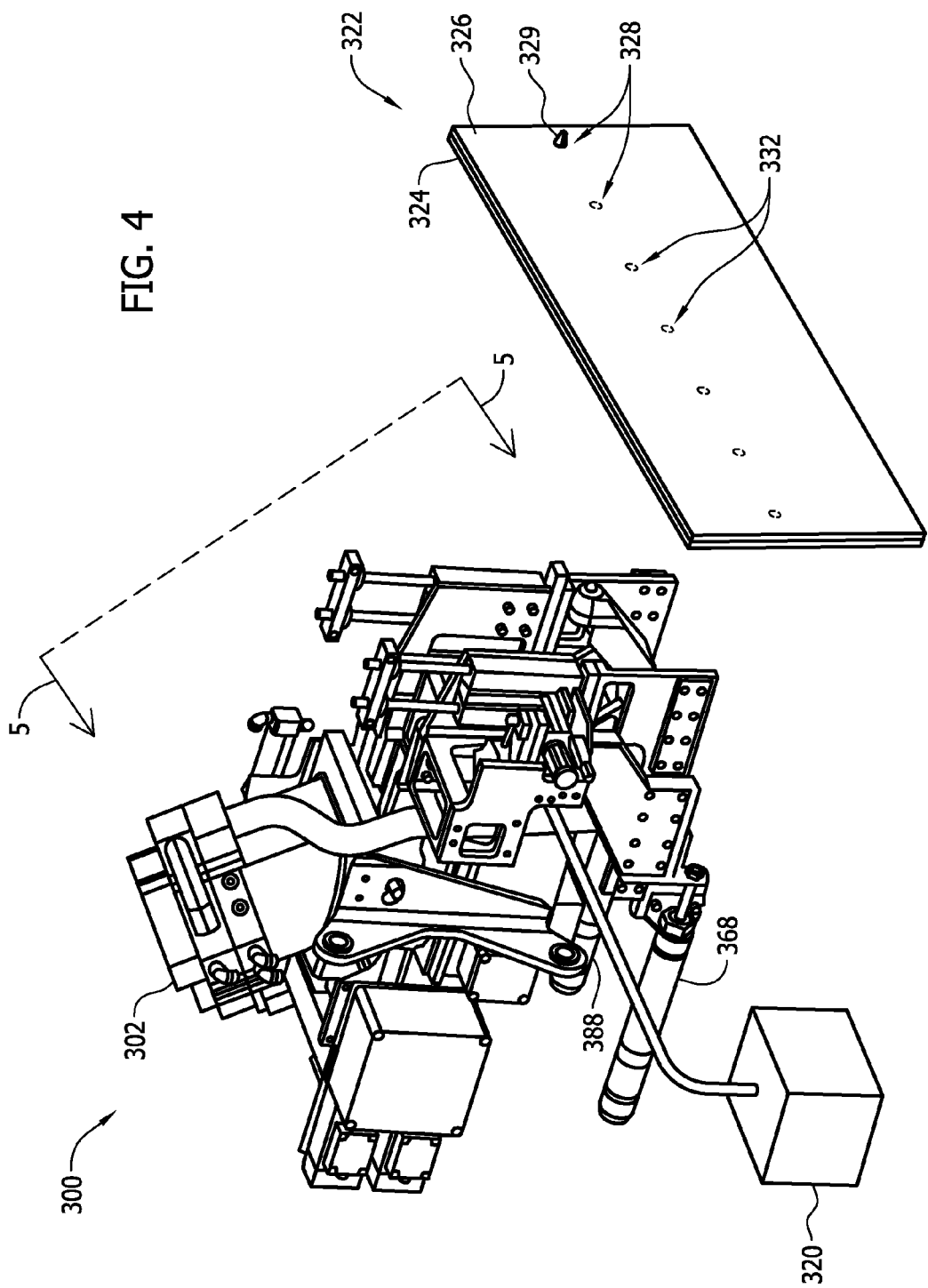
FIG. 4 is a perspective view of an exemplary automated apparatus.
Figure 5:
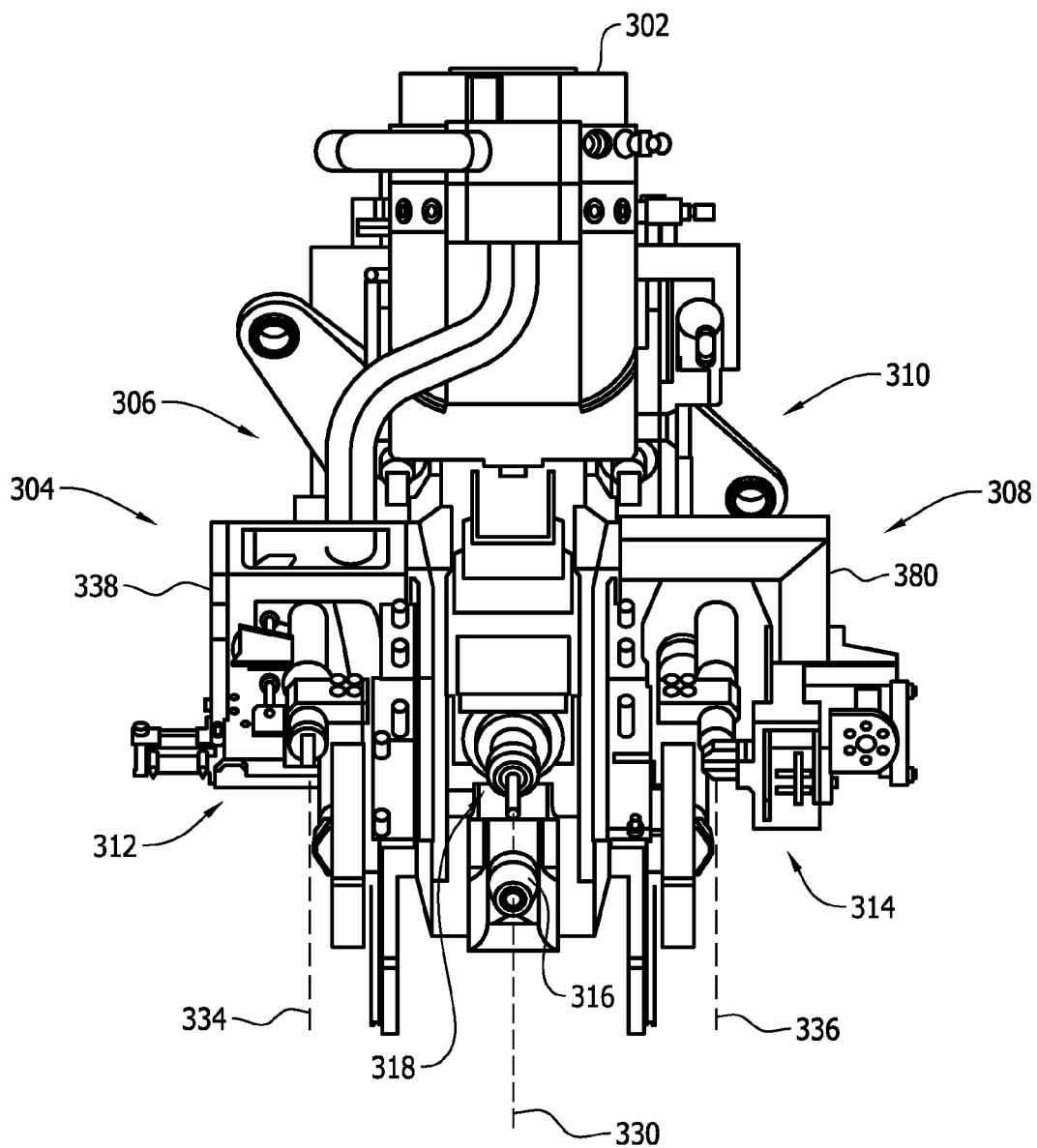
FIG. 5 is a view of the automated apparatus shown in FIG. 4 taken along Line 5.

FIG. 4 is a perspective view of an exemplary automated apparatus 300, and FIG. 5 is a view of automated apparatus 300 taken along Line 5. In the exemplary implementation, automated apparatus 300 includes an end effector 302 couplable to a robotic arm (not shown), a first sub-assembly 304 coupled to a first side 306 of end effector 302, and a second sub-assembly 308 coupled to a second side 310 of end effector 302. First sub-assembly 304 includes a temporary fastener insertion mechanism 312, and second sub-assembly 308 includes a temporary fastener removal mechanism 314. End effector 302 also includes a pressure foot 316 and a cutting mechanism 318 positioned between first and second sub-assemblies 304 and 308.

Automated apparatus 300 also includes a feed system 320 coupled in communication with first sub-assembly 304. Feed system 320 individually feeds temporary fasteners 200 (shown in FIG. 3) to insertion mechanism 312. As will be described in more detail below, end effector 302 is moveable relative to an assembly 322 to facilitate manufacture thereof. Assembly 322 includes a first component 324 and a second component 326 that each have complementary openings 328 formed therein. Feed system 320 selects a type of temporary fastener 200 from a plurality of temporary fasteners to be fed to insertion mechanism 312 as a function of a position of end effector 302 relative to assembly 322. For example, openings 328 of varying size may be formed in assembly 322 such that different sized temporary fasteners 200 are used to selectively engage assembly 322 through each opening 328. In some implementations, automated apparatus 300 includes a processor and a memory (each not shown) that stores manufacturing schematics of assembly 322. As such, feed system 320 selects the type of temporary fastener 200 to be engaged with assembly 322 as a function of an actual position of end effector 302 relative to assembly 322, and as a function of the type of temporary fastener used in the manufacturing schematics of assembly 322 at associated positions in the manufacturing schematics.

In operation, the robotic arm positions end effector 302 such that a cutting mechanism center point 330 of cutting mechanism 318 is substantially aligned with a potential opening location 332 on assembly 322. Pressure foot 316 presses against assembly 322 at potential opening location 332, and cutting mechanism 318 translates axially along cutting mechanism center point 330 to form openings 328 in assembly 322 at predetermined locations. End effector 302 is then positioned such that an insertion mechanism center point 334 of insertion mechanism 312 is substantially aligned with opening 328 that has been formed by cutting mechanism 318. Insertion mechanism 312 then inserts shaft portion 204 of temporary fastener 200 through opening 328, and engages temporary fastener 200 with assembly 322. In an alternative implementation, openings 328 are formed at each potential opening location 332 before inserting temporary fasteners 200 therein.

Once an installed temporary fastener 329 is ready to be removed from assembly 322, end effector 302 is positioned such that a removal mechanism center point 336 of removal mechanism 314 is substantially aligned with installed temporary fastener 329. Removal mechanism 314 then facilitates disengaging and removing installed temporary fastener 329 from assembly 322. In the exemplary implementation, each of cutting mechanism center point 330, insertion mechanism center point 334, and removal mechanism center point 336 are different from each other such that end effector 302 is moved to properly align each mechanism 312, 314, and 318 with assembly 322.

Figure 6:
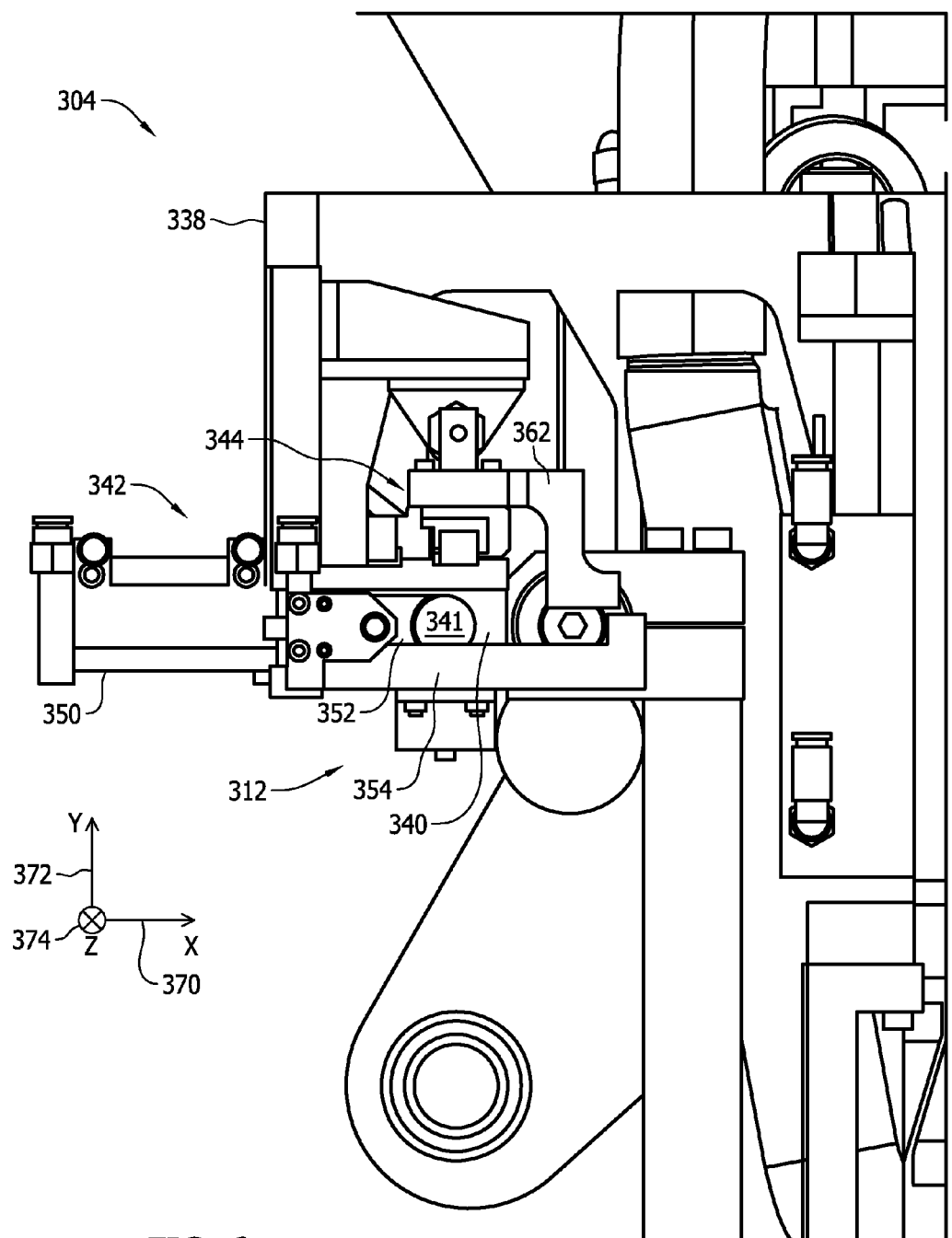
FIG. 6 is a front view of an exemplary first sub-assembly that may be used with the automated apparatus shown in FIG. 4.
Figure 7:
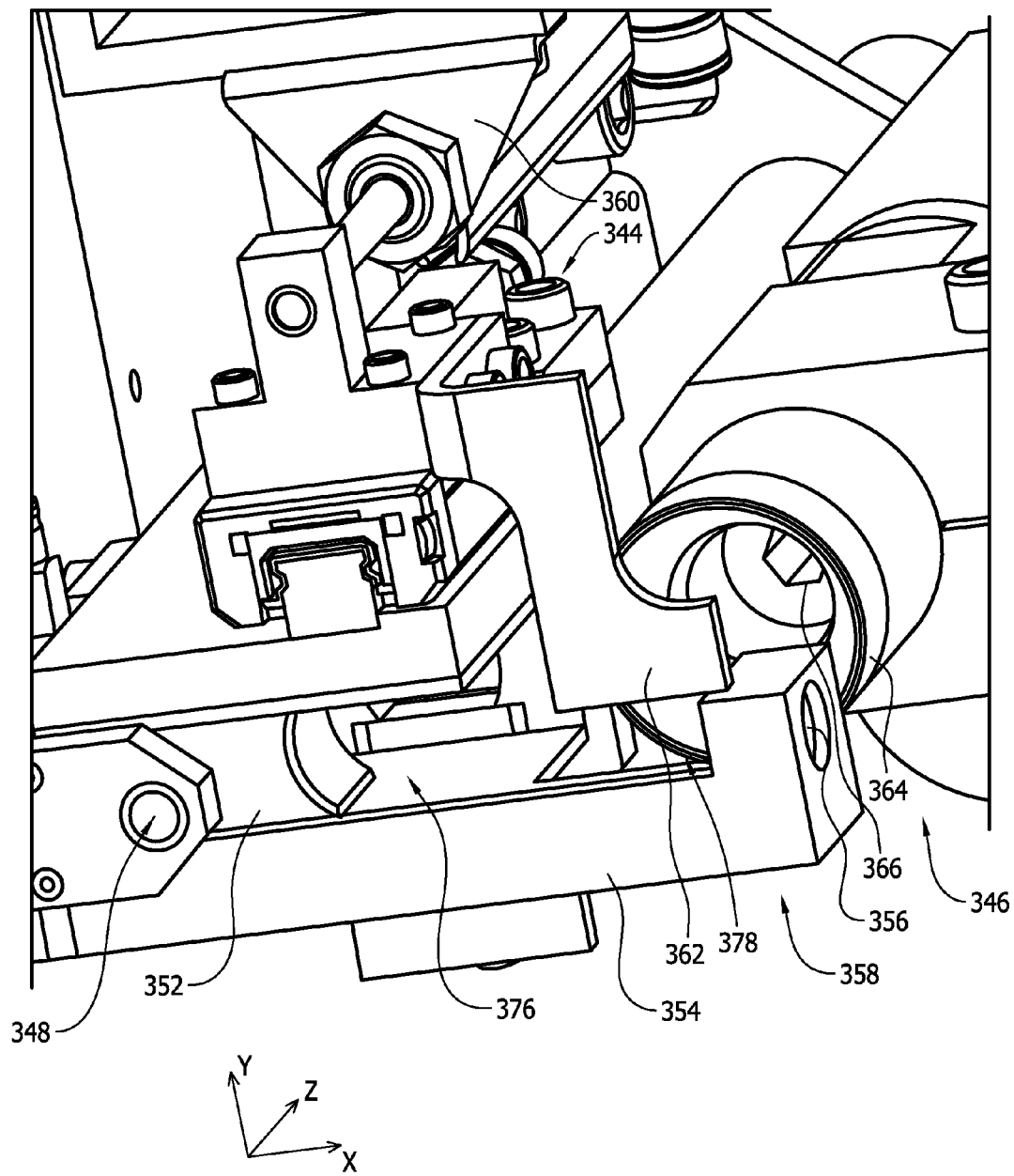
FIG. 7 is a perspective view of the first sub-assembly shown in FIG. 6.

FIG. 6 is a front view of first sub-assembly 304 that may be used with automated apparatus 300, and FIG. 7 is a perspective view of first sub-assembly 304. In the exemplary implementation, first sub-assembly 304 includes a first bracket 338 coupled to end effector 302 (shown in FIG. 4), and insertion mechanism 312 coupled to first bracket 338. Insertion mechanism 312 includes an insertion guide 340, a first slide mechanism 342, a second slide mechanism 344, and a first pneumatic driver 346. Insertion guide 340 includes a guide opening 341 sized to receive temporary fastener 200 (shown in FIG. 3) from feed system 320 (shown in FIG. 4) and a sensor 348. First slide mechanism 342 includes a first actuator 350, a first pusher 352 coupled to first actuator 350, and a tray 354 slidingly engaged with first pusher 352. Tray 354 includes at least one magnet 356 at a first end 358 thereof. Second slide mechanism 344 includes a second actuator 360 and a second pusher 362 coupled to second actuator 360.

First pneumatic driver 346 includes a first receptacle 364 that engages at least a portion of temporary fastener 200. More specifically, first receptacle 364 is sized to receive and engage barrel portion 202 (shown in FIG. 3) of temporary fastener 200 and includes a hex portion 366 for rotatably coupling with a hex portion (not shown) of temporary fastener 200 at first end 206 (shown in FIG. 3) thereof. Alternatively, first receptacle 364 and temporary fastener 200 may be rotatably coupled with any mechanism that enables insertion mechanism 312 to function as described herein. First pneumatic driver 346 is also coupled in communication with a first air cylinder 368 (shown in FIG. 4). As will be described in more detail below, first air cylinder 368 facilitates pneumatically actuating first pneumatic driver 346 when temporary fastener 200 is rotatably coupled with first receptacle 364 such that temporary fastener 200 can be engaged with assembly 322 (shown in FIG. 4). In an alternative implementation, temporary fastener 200 may be engaged with assembly 322 with any actuating mechanism that enables insertion mechanism 312 to function as described herein. Moreover, in some implementations, at least some components of insertion mechanism 312 selectively translate along at least one of an x-axis 370, a y-axis 372, and/or a z-axis 374 of automated apparatus 300.

In operation, insertion guide 340 receives a temporary fastener 200 to be installed in assembly 322, and positions temporary fastener 200 in a first loading position 376 within insertion mechanism 312. Specifically, temporary fastener 200 extends through guide opening 341 such that at least a portion of shaft portion 204 (shown in FIG. 3) extends past tray 354 in the negative z-direction, and sensor 348 determines whether temporary fastener 200 is in first loading position 376. First actuator 350 of first slide mechanism 342 actuates first pusher 352 to press against temporary fastener 200, and translate temporary fastener 200 along tray 354 from first loading position 376 towards a second loading position 378 in the positive x-direction. Magnets 356 at first end 206 of tray 354 facilitate maintaining temporary fastener 200 in second loading position 378 as first pusher 352 returns to first loading position 376. First pneumatic driver 346 then translates in the negative z-direction until first receptacle 364 fully engages temporary fastener 200. First pneumatic driver 346 then translates in the positive z-direction along with second pusher 362 actuated by second actuating mechanism. More specifically, second pusher 362 translates along with first pneumatic driver 346 in the negative z-direction and presses against second end 208 of barrel portion 202 (each shown in FIG. 3) to ensure first receptacle 364 fully engages temporary fastener 200, and translates along with first pneumatic driver 346 in the positive z-direction to ensure temporary fastener 200 disengages from magnets 356. Once tip portion 216 (shown in FIG. 3) of temporary fastener 200 clears tray 354, first pneumatic driver 346 translates in the negative y-direction to be substantially aligned with insertion mechanism center point 334 (shown in FIG. 5). If insertion mechanism center point 334 is substantially aligned with opening 328 in assembly 322, first pneumatic driver 346 translates in the negative z-direction and first air cylinder 368 actuates first pneumatic driver 346 to engage temporary fastener 200 with assembly 322.

Figure 8:
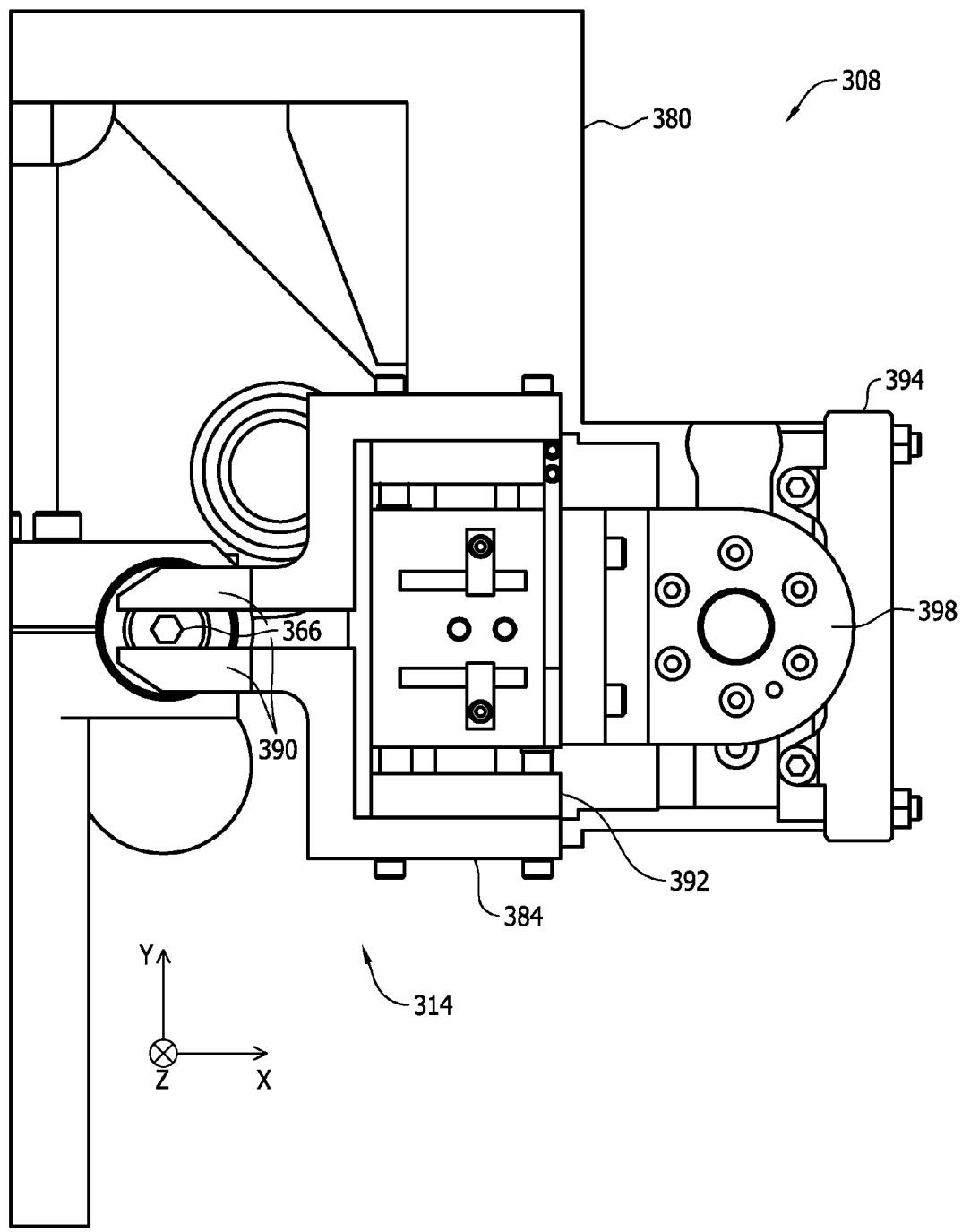
FIG. 8 is a front view of an exemplary second sub-assembly that may be used with the automated apparatus shown in FIG. 4.
Figure 9:
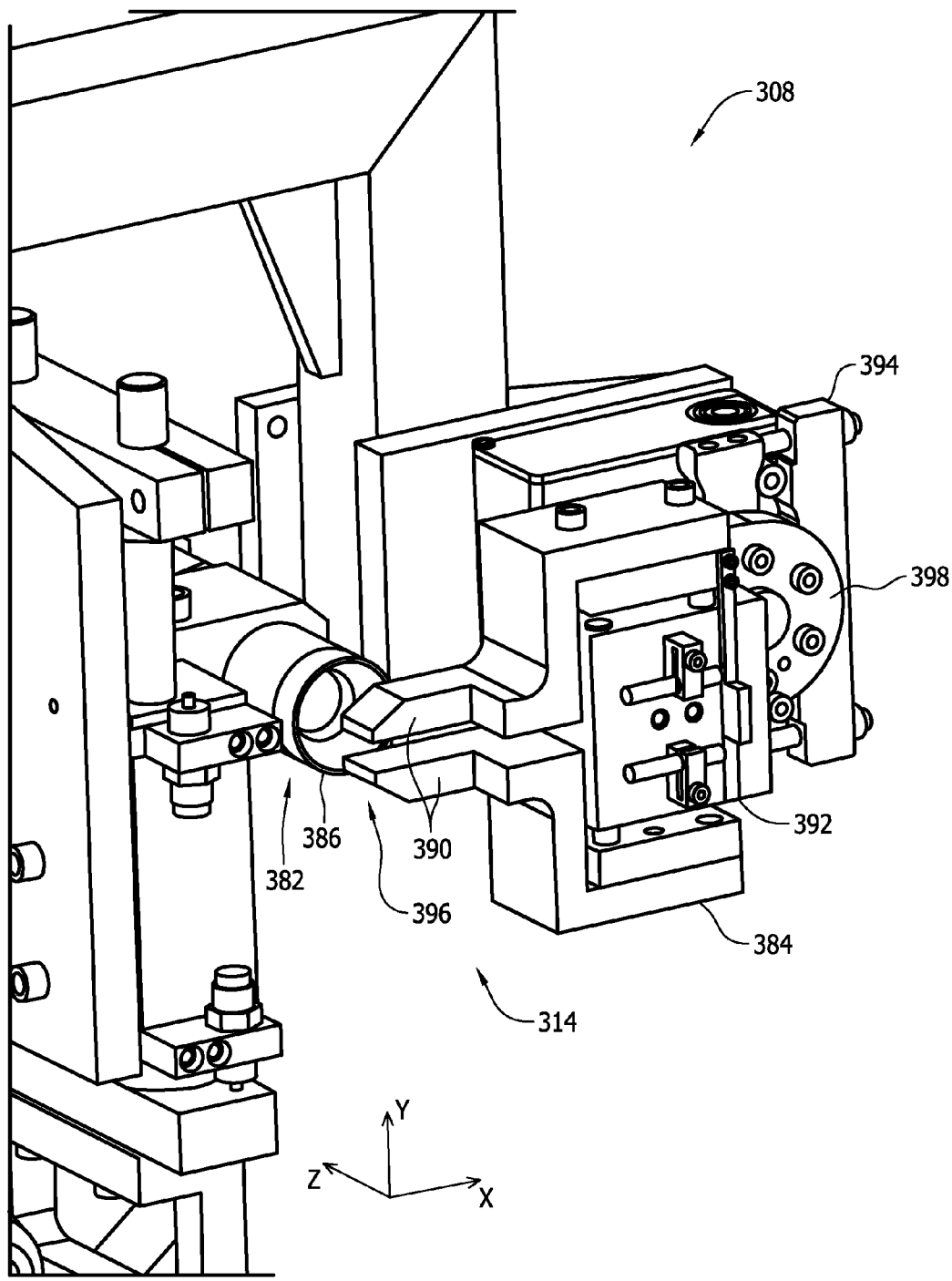
FIG. 9 is a perspective view of the second sub-assembly shown in FIG. 8.

FIG. 8 is a front view of second sub-assembly 308 that may be used with automated apparatus 300, and FIG. 9 is a perspective view of second sub-assembly 308. In the exemplary implementation, second sub-assembly 308 includes a second bracket 380 coupled to end effector 302 (shown in FIG. 4), and removal mechanism 314 coupled to second bracket 380. Removal mechanism 314 includes a second pneumatic driver 382 and a gripping mechanism 384.

Second pneumatic driver 382 includes a second receptacle 386 that engages at least a portion of installed temporary fastener 329 (shown in FIG. 4). More specifically, second receptacle 386 is sized to receive and engage barrel portion 202 (shown in FIG. 3) of temporary fastener 200 and includes a hex portion 366 for rotatably coupling with a hex portion (not shown) of temporary fastener 200 at first end 206 (shown in FIG. 3) thereof. Alternatively, second receptacle 386 and temporary fastener 200 may be rotatably coupled with any mechanism that enables removal mechanism 314 to function as described herein. Second pneumatic driver 382 is also coupled in communication with a second air cylinder 388 (shown in FIG. 4). As will be described in more detail below, second air cylinder 388 facilitates pneumatically actuating second pneumatic driver 382 when temporary fastener 200 is rotatably coupled with second receptacle 386 such that temporary fastener 200 can be disengaged from assembly 322 (shown in FIG. 4). In an alternative implementation, temporary fastener 200 may be disengaged from assembly 322 with any actuating mechanism that enables removal mechanism 314 to function as described herein.

Gripping mechanism 384 includes a pair of jaws 390, and a third actuating mechanism 392 coupled to jaws 390. Alternatively, gripping mechanism 384 may be any mechanism capable of removing temporary fastener 200 from second receptacle 386. Moreover, second sub-assembly 308 includes a fourth actuating mechanism 394 coupled to gripping mechanism 384.

In operation, end effector 302 moves relative to assembly 322 such that removal mechanism center point 336 (shown in FIG. 5) substantially aligns with installed temporary fastener 329. Fourth actuating mechanism 394 translates gripping mechanism 384 in the positive x-direction to ensure installed temporary fastener 329 can be engaged with second receptacle 386. Second pneumatic driver 382 then translates in the negative z-direction to fully engage installed temporary fastener 329, and second air cylinder 388 actuates second pneumatic driver 382 to disengage installed temporary fastener 329 from assembly 322. Second pneumatic driver 382 then translates in the positive z-direction to translate temporary fastener 200 towards a first unloading position 396. Gripping mechanism 384 translates in the negative x-direction towards first unloading position 396 until shaft portion 204 (shown in FIG. 3) of temporary fastener 200 is positioned between jaws 390. Jaws 390 are actuated by third actuating mechanism 392 to engage shaft portion 204 as second pneumatic driver 382 translates in the positive z-direction until temporary fastener 200 is disengaged from second receptacle 386. In one implementation, gripping mechanism 384 then rotates relative to a rotatable coupling 398, jaws 390 release temporary fastener 200, and temporary fastener 200 falls into a storage bin (not shown) positioned below gripping mechanism 384.

A method of selectively installing temporary fasteners 200 in assembly 322 is also provided herein. The temporary fasteners 200 are selectively installed using end effector 302 including cutting mechanism 318 and temporary fastener insertion mechanism 312. The method includes substantially aligning cutting mechanism center point 330 of cutting mechanism 318 with potential opening location 332 on assembly 322, and forming, with cutting mechanism 318, opening 328 in assembly 322 at potential opening location 332. The method also includes substantially aligning insertion mechanism center point 334 of temporary fastener insertion mechanism 312 with opening 328 formed in assembly 322, wherein insertion mechanism center point 334 is different than cutting mechanism center point 330. At least one of temporary fasteners 200 is inserted, with temporary fastener insertion mechanism 312, through opening 328 in assembly 322.

End effector also includes temporary fastener removal mechanism 314. The method further includes substantially aligning removal mechanism center point 336 of temporary fastener removal mechanism 314 with at least one temporary fastener 329 installed in assembly 322, and removing, with temporary fastener removal mechanism 314, the at least one temporary fastener 329 from assembly 322. The at least one temporary fastener 200 is then translated towards unloading position 396.

Moreover, the method includes feeding temporary fasteners 200 to temporary fastener insertion mechanism 312 individually. In some implementations, feeding temporary fasteners 200 includes selecting a type of temporary fastener 200 from a plurality of different temporary fasteners to feed to temporary fastener insertion mechanism 312 as a function of a position of end effector 302 relative to assembly 322. In one implementation, inserting at least one of the temporary fasteners 200 includes translating the at least one of the temporary fasteners 200 from a loading position 376 and/or 378 into substantial alignment with insertion mechanism center point 334.

The implementations described herein relate to an automated apparatus that selectively installs temporary fasteners in an assembly. More specifically, the automated apparatus includes mechanisms that facilitate forming openings in assembly, installing a temporary fastener in the assembly at predetermined openings, and uninstalling temporary fasteners from the assembly prior to installation of more permanent fasteners in the assembly. The temporary fasteners are used to maintain alignment of openings formed in adjacent components of the assembly. As such, the automated apparatus described herein facilitates manufacturing assemblies in a more time-efficient and cost effective-manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated apparatus for use in installing temporary fasteners in, and removing temporary fasteners from, an assembly, said apparatus comprising:
   an end effector;
   a cutting mechanism coupled to said end effector, wherein said cutting mechanism is configured to form an opening in the assembly when said end effector moves said cutting mechanism such that an opening location is aligned with a cutting mechanism translational axis along which the cutting mechanism is translated to form the opening; and
   a first sub-assembly coupled to said end effector, wherein said first sub-assembly comprises a temporary fastener insertion mechanism configured to insert at least one uninstalled temporary fastener of the temporary fasteners through the opening in the assembly when said end effector moves said temporary fastener insertion mechanism such that the opening is aligned with an insertion mechanism translational axis along which the at least one uninstalled temporary fastener is moved by the temporary fastener insertion mechanism to install the at least one uninstalled temporary fastener into the opening, wherein said temporary fastener insertion mechanism comprises a slide mechanism configured to translate the at least one uninstalled temporary fastener from a first loading position spaced from the insertion mechanism translational axis, towards a second loading position aligned with the insertion mechanism translational axis, and wherein said slide mechanism comprises at least one magnet configured to maintain the at least one uninstalled temporary fastener in the second loading position.

2. The apparatus in accordance with claim 1 further comprising a feed system coupled in communication with said first sub-assembly, wherein said feed system is configured to individually feed the at least one uninstalled temporary fastener to said temporary fastener insertion mechanism.

3. The apparatus in accordance with claim 2, wherein said feed system is configured to select a type of temporary fastener from a plurality of different types of temporary fasteners to be fed to said temporary fastener insertion mechanism as a function of a position of said end effector relative to the assembly.

4. The apparatus in accordance with claim 1. wherein said first sub-assembly comprises a pneumatic driver comprising a receptacle configured to engage a barrel portion of the at least one uninstalled temporary fastener, wherein said pneumatic driver is operable to selectively engage the at least one-uninstalled temporary fastener with the assembly.

5. The apparatus in accordance with claim 1 wherein said temporary fastener insertion mechanism comprises:

an insertion guide configured to position the at least one uninstalled temporary fastener in the first loading position; and a first pneumatic driver comprising a first receptacle configured to engage the at least one uninstalled temporary fastener at the second loading position.

6. The apparatus in accordance with claim 1 further comprising a second sub-assembly coupled to said end effector, wherein said second sub-assembly comprises a temporary fastener removal mechanism configured to remove an installed temporary fastener of the temporary fasteners from the assembly when the installed temporary fastener is aligned with a removal mechanism translational axis.

7. The apparatus in accordance with claim 6, wherein said first sub-assembly comprises a first pneumatic driver comprising a first receptacle configured to engage a barrel portion of the at least one uninstalled temporary fastener, wherein said first pneumatic driver is operable to engage the at least one uninstalled temporary fastener with the assembly, and wherein said second sub-assembly comprises a second pneumatic driver comprising a second receptacle configured to engage the barrel portion of the installed temporary fastener, wherein said second pneumatic driver is operable to remove the installed temporary fastener from the assembly.

8. The apparatus in accordance with claim 6, wherein said temporary fastener removal mechanism comprises:
   a pneumatic driver comprising a receptacle configured to engage the installed temporary fastener and disengage the installed temporary fastener from the assembly; and
   a gripping mechanism configured to remove the installed temporary fastener from the receptacle.

9. A method of using the automated apparatus according to claim 1, said method comprising:
   aligning the cutting mechanism translational axis with the opening location of the assembly;
   forming, with the cutting mechanism, the opening in the assembly at the opening location;
   aligning the insertion mechanism translational axis of the temporary fastener insertion mechanism with the opening formed in the assembly; and
   inserting, with the temporary fastener insertion mechanism, the at least one uninstalled temporary fastener of the temporary fasteners through the opening in the assembly.

10. The method in accordance with claim 9, wherein the end effector further includes a temporary fastener removal mechanism, said method comprising:
    aligning a removal mechanism translational axis of the temporary fastener removal mechanism with an installed temporary fastener installed in the assembly; and
    removing, with the temporary fastener removal mechanism, the installed temporary fastener from the assembly.

11. The method in accordance with claim 10 further comprising, translating the removed temporary fastener towards an unloading position.

12. The method in accordance with claim 9 further comprising feeding the at least one uninstalled temporary fastener to the temporary fastener insertion mechanism individually.

13. The method in accordance with claim 12, wherein feeding the at least one uninstalled temporary fastener comprises selecting a type of temporary fastener from a plurality of different types of temporary fasteners to feed to the temporary fastener insertion mechanism as a function of a position of the end effector relative to the assembly.

14. The method in accordance with claim 9, wherein inserting the at least one uninstalled temporary fastener comprises translating the at least one uninstalled temporary fastener from the first loading position into alignment with the insertion mechanism translational axis.

15. An end effector of an automated apparatus, said end effector configured for use in installing temporary fasteners in, and removing temporary fasteners from, an assembly, said end effector comprising:
    a cutting mechanism coupled to said end effector, wherein said cutting mechanism is configured to form an opening in the assembly when said end effector moves said cutting mechanism such that an opening location is aligned with a cutting mechanism translational axis along which the cutting mechanism is translated to form the opening;
    a first sub-assembly coupled to the end effector, wherein said first sub-assembly comprises a temporary fastener insertion mechanism configured to insert at least one uninstalled temporary fastener of the temporary fasteners through the opening in the assembly when said end effector moves said temporary fastener insertion mechanism such that the opening is aligned with an insertion mechanism translational axis along which the at least one uninstalled temporary fastener is moved by the temporary fastener insertion mechanism to install the at least one uninstalled temporary fastener into the opening, wherein said temporary fastener insertion mechanism comprises a slide mechanism configured to translate the at least one uninstalled temporary fastener from a first loading position spaced from the insertion mechanism translational axis, towards a second loading position aligned with the insertion mechanism translational axis, and wherein said slide mechanism comprises at least one magnet configured to maintain the at least one uninstalled temporary fastener in the second loading position; and
    a second sub-assembly coupled to the end effector, wherein said second sub-assembly comprises a temporary fastener removal mechanism configured to remove an installed temporary fastener of the temporary fasteners from the assembly when the installed temporary fastener is aligned with a removal mechanism translational axis.

16. The end effector in accordance with claim 15, wherein said temporary fastener insertion mechanism comprises:
    an insertion guide configured to position the at least one uninstalled temporary fastener in the first loading position; and
    a first pneumatic driver comprising a first receptacle configured to engage the at least one uninstalled temporary fastener at the second loading position.

17. The end effector in accordance with claim 16 further comprising a second slide mechanism configured to translate along with said first pneumatic driver as said first pneumatic driver translates the at least one uninstalled temporary fastener from the second loading position towards the opening in the assembly.

* * * * *